United States Patent
Herrero et al.

(10) Patent No.: US 10,722,958 B2
(45) Date of Patent: Jul. 28, 2020

(54) PUNCHING DEVICE, PUNCH AND METHOD

(71) Applicant: MAQUINARIA GEKA, S.A., Oiartzun (Guipúzcoa) (ES)

(72) Inventors: Alberto José Herrero, Oiartzun (ES); Mikel Pardavila, Oiartzun (ES)

(73) Assignee: Activos Industriales Madama, S.L., Donostia—San Sebasriàn, Guipùzcoa (ES)

( * ) Notice: Subject to any disclaimer, the term of this patent is extended or adjusted under 35 U.S.C. 154(b) by 420 days.

(21) Appl. No.: 15/704,249

(22) Filed: Sep. 14, 2017

(65) Prior Publication Data

US 2018/0071842 A1 Mar. 15, 2018

(30) Foreign Application Priority Data

Sep. 14, 2016 (EP) .................................. 16382429

(51) Int. Cl.
| | |
|---|---|
| *B21D 28/34* | (2006.01) |
| *B23D 37/10* | (2006.01) |
| *B23P 17/00* | (2006.01) |
| *B23P 13/00* | (2006.01) |
| *B23D 43/02* | (2006.01) |
| *B21D 28/16* | (2006.01) |

(52) U.S. Cl.
CPC ............. *B23D 37/10* (2013.01); *B21D 28/34* (2013.01); *B23D 43/02* (2013.01); *B23P 13/00* (2013.01); *B23P 17/00* (2013.01); *B21D 28/16* (2013.01)

(58) Field of Classification Search
CPC ........ B21D 28/16; B21D 28/26; B21D 28/34; Y10T 83/94; Y10T 83/9432; B23D 37/00; B23D 37/08; B23D 37/10; B23D 43/00; B23P 15/42
See application file for complete search history.

(56) References Cited

U.S. PATENT DOCUMENTS

| | | | | |
|---|---|---|---|---|
| 199,715 | A | | 1/1878 | Jenkins |
| 237,439 | A | | 2/1881 | Jenkins |
| 1,441,502 | A | * | 1/1923 | Hook ..................... B23D 43/02 407/1 |
| 2,060,889 | A | * | 11/1936 | Nilsson ................ B23D 43/005 407/18 |
| 2,314,160 | A | * | 3/1943 | Phaneuf ................. B23D 43/02 407/18 |
| 2,490,029 | A | * | 12/1949 | Clawson ................ B23D 43/02 407/13 |
| 2,522,440 | A | * | 9/1950 | Freter .................... B21D 28/34 72/464 |

(Continued)

FOREIGN PATENT DOCUMENTS

| | | |
|---|---|---|
| GB | 19994 A | 2/1895 |
| JP | 4717286 U | 10/1972 |

(Continued)

*Primary Examiner* — Adam J Eiseman
*Assistant Examiner* — Bobby Yeonjin Kim
(74) *Attorney, Agent, or Firm* — The Webb Law Firm

(57) ABSTRACT

A punching device for punching a workpiece includes a punching part and a broaching part. The punching part has a punching cutting edge that limits a punching cutting area, the punching part being intended to pierce the workpiece. The broaching part is intended to tear the workpiece later than the punching part, and includes at least a broaching tooth with a cutting edge that limits a cutting area which is greater than the punching cutting area.

13 Claims, 3 Drawing Sheets

(56) References Cited

U.S. PATENT DOCUMENTS

| | | | | |
|---|---|---|---|---|
| 2,566,738 | A | * | 9/1951 | Mitehell ............ B25D 3/00 30/368 |
| 4,762,043 | A | * | 8/1988 | Sneed ............ B21D 28/34 83/686 |
| 5,503,506 | A | * | 4/1996 | Yuan ............ B23D 43/02 407/13 |
| 7,487,703 | B2 | * | 2/2009 | Lockhart ............ B21D 28/34 83/621 |
| 2004/0045717 | A1 | * | 3/2004 | Haugen ............ B23D 37/08 166/379 |
| 2004/0109731 | A1 | * | 6/2004 | Weghaus ............ B23D 43/02 407/19 |

FOREIGN PATENT DOCUMENTS

| | | |
|---|---|---|
| JP | 50110895 | 9/1975 |
| JP | 55106528 U | 7/1980 |
| JP | 2003266385 A | 9/2003 |
| JP | 2013018004 A | 1/2013 |

* cited by examiner

PUNCHING DEVICE, PUNCH AND METHOD

CROSS REFERENCE TO RELATED APPLICATIONS

This application is related to and claims the benefit of Spanish Patent Application No. EP16382429, filed on Sep. 14, 2016, the contents of which are herein incorporated by reference in their entirety.

TECHNICAL FIELD

This disclosure belongs to the field of punching machines, and the devices used in these machines.

BACKGROUND

Conventional punching consists of hitting a workpiece between a punch and a die, in such a way that the punch pierces the workpiece, and enters the die, creating a hole in said workpiece. This process is an example of shearing processes, where the workpiece is deformed until the ultimate strength is overcome, and the affected section breaks.

If the punch is performed in a sheet workpiece which is too thick, the punching operation produces a very poor quality result: when the punch enters the workpiece, a first zone with a burnished cut is created, but this regular cut only lasts for approximately the first third of the sheet thickness. Due to growing shear stresses, the rest of the inner shape of the hole is quite irregular, with a pseudo conical shape, the diameter of the hole growing wider as the punch goes deeper, further producing a burr at the end of the cut and also producing microscopic cracks. This scenario is not adequate for workpieces which are to be used in responsibility structures, as, besides the bad tolerances of the hole shape, these microscopic cracks could cause the failure of the workpiece and the collapse of the structure when it is subjected to cyclic stresses.

Drilling is preferred for those cases, as it produces a much more regular finishing, with better dimensional tolerances and without said cracks. Drilling is an example of chip removing processes, where a tool is used to locally cut a thin layer of the material thanks to a fast rotatory movement. However, drilling is much slower and more expensive than punching, since the drill advance direction is not the same as the drill cut direction (which is rotative). A punching procedure that produced a good surface finishing, without the conical shape and without the microscopic cracks would be more advantageous than drilling, as it would further be cheaper and faster.

SUMMARY

This problem is solved by a punching device according to claim 1, a punch according to claim 11 and a method according to claim 12. Preferred embodiments of the disclosure are defined in dependent claims.

In a first aspect, the disclosure provides a punching device for punching a workpiece, the punching device comprising:
- a punching part comprising a punching cutting edge that limits a punching cutting area, the punching part being intended to pierce the workpiece; and
- a broaching part intended to tear the workpiece later than the punching part, the broaching part comprising at least a broaching tooth comprising a broaching cutting edge that limits a broaching cutting area, in such a way that the broaching teeth as a whole define a total broaching cutting area which is greater than the punching cutting area.

This punching device is particularly advantageous for making a hole in a workpiece. The punching part contacts the workpiece first, and make the usual hole, with conical shape, microscopic cracks and the problems described in the previous section. But with the punching device of the disclosure it is possible that, without the workpiece being moved, the broaching part contacts the workpiece next and eliminates the zone of the hole that has said unwanted profile, burr and cracks. With such a punching device, it is possible to achieve a good finish and accurate in tolerance hole in a thick workpiece without resorting to a drilling machine.

The punching cutting area and the broaching cutting areas have usually a similar shape. The punching device of the disclosure may be embodied with punching cutting areas and broaching cutting areas having a wide variety of shapes, including the common shapes found in machining applications: circular, oval, rectangular, etc.

The broaching portion may comprise one or more broaching teeth, but the relevant aspect is that, considering the cutting area which is performed by the total amount of broaching teeth, either one or more, this cutting area, called total broaching cutting area, is greater than the punching cutting area.

In a particular embodiment, the broaching part further comprises at least a first broaching tooth and a second broaching tooth.

This embodiment advantageously divides the broaching operation between two broaching teeth, thus lowering the stress suffered by each tooth.

In a particular embodiment, the first broaching tooth comprises a first broaching cutting edge limiting a first broaching cutting area and the second broaching tooth comprises a second broaching cutting edge limiting a second broaching cutting area, the first broaching cutting area covering the punching cutting area except for at least one first gap, the second broaching cutting area covering the at least one first gap.

This embodiment takes advantage of the relative shape of the punching cutting edge and the first and second broaching cutting edges. When the first broaching tooth broaches the workpiece, the first broaching cutting edge leaves first gaps in the workpiece, which are zones that were cut by the punching cutting edge but are not cut by the first broaching cutting edge. The second broaching tooth has such a second broaching cutting edge that the first gaps are inside the second broaching cutting area. As a consequence, the first gaps left by the first broaching cutting edge are cut by the second broaching cutting edge. This is advantageous because no continuous chip is formed by any of these first and second broaching cutting edges. When the first broaching cutting edge cuts the workpiece, the first gaps are zones where chip is interrupted: the first broaching cutting edge cuts some material, but as the first gaps are zones where no material is cut, the chip is there interrupted. The second broaching cutting edge cuts the material of these first gaps, but as these gaps are not connected between them, the chip generated by the second broaching cutting edge is also discontinuous.

It may happen that the first broaching cutting area is lower than the punching cutting area, due to the gaps, and the second broaching cutting area may also comprise another gaps that make it also lower than the punching cutting area, but the relevant issue is that the total broaching cutting area, which in this case is the cutting area cut by both first and second broaching teeth, is greater than the punching cutting area.

In a particular embodiment, the broaching part further comprises a third broaching tooth and a fourth broaching tooth.

This embodiment advantageously divides the broaching operation between four broaching teeth, thus lowering the stress suffered by each tooth.

In a particular embodiment, the third broaching tooth comprises a third broaching cutting edge limiting a third broaching cutting area and the fourth broaching tooth comprises a fourth broaching cutting edge limiting a fourth broaching cutting area greater than the first broaching cutting area. The third broaching cutting area is greater than the first broaching cutting area and covers the second broaching cutting area except for at least one second gap whilst the fourth broaching cutting area covers the at least one second gap.

These embodiments take advantage of the relative shape of the second, third and fourth broaching cutting edges. When the third broaching tooth broaches the workpiece, the third broaching cutting edge leaves second gaps in the workpiece, which are zones that were cut by the second broaching cutting edge but are not cut by the third broaching cutting edge. The fourth broaching tooth has such a fourth broaching cutting edge that the second gaps are inside the fourth broaching cutting area. As a consequence, the second gaps left by the third broaching cutting edge are cut by the fourth broaching cutting edge. This is advantageous because no continuous chip is formed by any of these third and fourth broaching cutting edges. When the third broaching cutting edge cuts the workpiece, the second gaps are zones where chip is interrupted: the third broaching cutting edge cuts some material, but as the second gaps are zones where no material is cut, the chip is there interrupted. The fourth broaching cutting edge cuts the material of these second gaps, but as these gaps are not connected between them, the chip generated by the fourth broaching cutting edge is also discontinuous.

It may happen that the third broaching cutting area is lower than the second broaching cutting area, due to the gaps, and the fourth broaching cutting area may also comprise another gaps that make it also lower than the second broaching cutting area, but the relevant issue is that the total broaching cutting area, which in this case is the cutting area cut by both third and fourth broaching teeth, is greater than the second broaching cutting area.

These embodiments ensure a soft transition between the broaching part and the rest of the elements that takes part in the punching operation.

In a particular embodiment, the broaching part further comprising a final broaching tooth, with a final broaching cutting edge that limits a final broaching cutting area greater than any other broaching cutting area. The final broaching cutting area is substantially the same as the cross section of the final hole in the workpiece, is also substantially the same as the cross section of the die hole.

This final broaching tooth is useful to improve the surface finish and remove the blunter cut performed by the first broaching teeth.

In a preferred embodiment the punching cutting edge is circular and comprises a punching radius, the first broaching cutting edge comprises first broaching circle arcs with a first broaching radius of curvature and the second broaching cutting edge comprise second broaching circle arcs with a second broaching radius of curvature which is the same as the first broaching radius of curvature and greater than the punching radius, and wherein the first broaching circle arcs and the second broaching circle arcs have the same centre.

In this embodiment, the first and second broaching teeth collaborate to cut a portion of the workpiece, as each of the first and second broaching teeth comprise parts of the same circle, since they have the same radius of curvature and the same centre. In this embodiment, between the punching portion, the first and the second broaching teeth, a circular portion having the first broaching radius of curvature is broached from the workpiece.

In a preferred embodiment, the third broaching cutting edge comprises third broaching circle arcs with a third broaching radius of curvature, and the fourth broaching cutting edge comprises fourth broaching circle arcs with a fourth radius of curvature which is the same as the third broaching radius of curvature and greater than the first broaching radius of curvature, and wherein the third broaching circle arcs and the fourth broaching circle arcs have the same centre.

In this embodiment, the third and fourth broaching teeth collaborate to cut a portion of the workpiece, as each of the third and fourth broaching teeth comprise parts of the same circle, since they have the same radius of curvature and the same centre. In this embodiment, between the punching portion, the first and the second broaching teeth and the third and fourth broaching teeth, a circular portion having the third broaching radius of curvature is broached from the workpiece.

In alternative embodiments the punching cutting edge, the first, second, third and fourth broaching cutting edges may have square cross section, or rectangular cross section, elliptical cross section or ovoid cross section.

In one embodiment the first broaching cutting edge further comprises at least one straight portion such that the first broaching cutting area is a circle with at least one chord in such a way that the first gap is a circular segment.

This embodiment represents a particular way of obtaining these gaps, which will be covered by the subsequent broaching cutting area, which in this case is the second broaching cutting area.

In one embodiment, the third broaching cutting edge further comprises at least one straight portion such that the third broaching cutting area is a circle with at least one chord in such a way that the second gap is a circular segment.

This embodiment represents a particular way of obtaining these gaps, which will be covered by the subsequent broaching cutting area, which in this case is the fourth broaching cutting area.

In a particular embodiment, the second broaching cutting area is between 1.025 and 2.8 times the punching cutting area.

This ratio covers the main commercial holes size which may be punched with such a punching device when the punching operation and the broaching operation are not carried out in the same hit. The smallest hole size, a 3 mm diameter hole, would suffer a broaching of 2 mm in diameter, in such a way that the final hole would have a 5 mm diameter. This final surface is substantially 2.8 times the first surface. On the contrary, the smallest proportional broaching operation would be when considering the biggest hole size, with a 160 mm diameter hole, that would end in 162 mm after the broaching operation. This represents 1.025 times the first surface.

In a particular embodiment, the punching part and the broaching part are attached and are portions of a single punch.

With such a punching device, the outcome is achieved in a single operation, as the punching part and the broaching part are part of the same tool, and act on the workpiece in the same hit. Accordingly, the combination of these two portions in the same tool, placed subsequently in this order, gives rise to a new and synergic effect, producing a hole in a thick workpiece with a good dimensional tolerance and surface finishing, which none of the two portions may achieve on their own.

In this particular embodiment (when the punching operation and the broaching operation are carried out in the same hit) the second broaching cutting area (or the fourth broaching cutting area when there are four teeth) is up to 1.25 times the punching cutting area. In this case, the maximum broaching removal depends on the thickness of the workpiece and the play between the die and the punch.

The disclosure also provides a punch comprising
  a punching part comprising a punching cutting edge that limits a punching cutting area, the punching part being intended to pierce the workpiece; and
  a broaching part attached to the punching part and intended to tear the workpiece later than the punching part, the broaching part comprising at least a one broaching tooth comprising a broaching cutting edge that limits a broaching cutting area which is greater than the punching cutting area.

With such a punching device, the outcome is achieved in a single operation, as the punching part and the broaching part are part of the same punch, and act on the workpiece in the same hit. Accordingly, the combination of these two portions in the same punch, placed subsequently in this order, gives rise to a new and synergic effect, producing a hole in a thick workpiece with a good dimensional tolerance and surface finishing, which none of the two portions may achieve on their own.

In a second aspect, the disclosure provides a punching method including the steps of:
  providing a punching machine with a punching device according to the first aspect;
  punching a workpiece with this punching device; and
  broaching the workpiece with the punching device.

With this method, the punching part contacts the workpiece first, and makes the usual hole, with conical shape and microscopic cracks. Without the workpiece being moved (or transferred to another unit, station or machine), the broaching part, which contacts the workpiece next, eliminates the zone of the hole that has said burr and cracks.

In a particular embodiment, the punching part and the broaching part pierce the workpiece in the same hit of the punching machine.

With such a punching method, the outcome is achieved in a single operation, as the punching part and the broaching part are part of the same tool, and act on the workpiece in the same hit. The final result is a hole in a thick workpiece with a good dimensional tolerance and surface finishing, which none of the two portions may achieve on their own.

In a particular embodiment, the punching part and the broaching part pierce the workpiece in two different hits of the punching machine.

This method is an easy way of make use of simple punches, by adapting a broach to the punching machine.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures:

FIG. 4b shows the result of the punching device entering the workpiece from FIG. 4a;

FIG. 5b shows the result of the punching device entering the workpiece from FIG. 5a.

DETAILED DESCRIPTION OF THE DRAWINGS

Figure 1A:
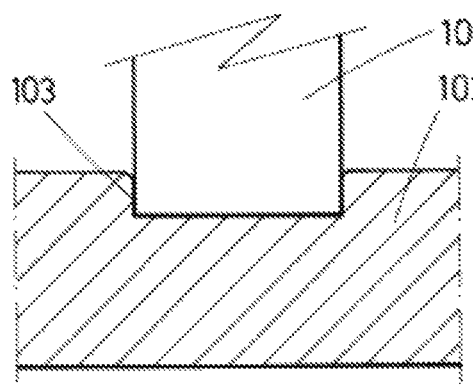
FIGS. 1a and 1b show a scheme of a punching operation with a punch according to a method which is already known in the state of the art wherein the workpiece is too thick for the punch.
Figure 1B:
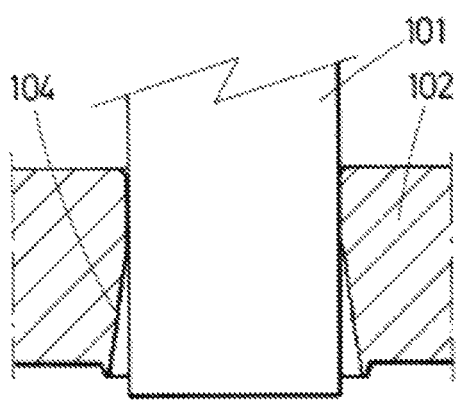

FIGS. 1a and 1b show a scheme of a punching operation as already known in the state of art, where the workpiece is too thick for the punch. The threshold value which defines when a workpiece is too thick depends on the material of the workpiece and the material of the punch.

FIG. 1a shows a conventional punch 101 entering the workpiece 102. During the first third of the thickness, the cut is regular, and a burnished surface 103 is obtained.

FIG. 1b shows the final outcome of the punching operation. The conventional punch 101 exits the workpiece 102 after piercing it, leaving an irregular conical surface 104 after it.

Figure 2:
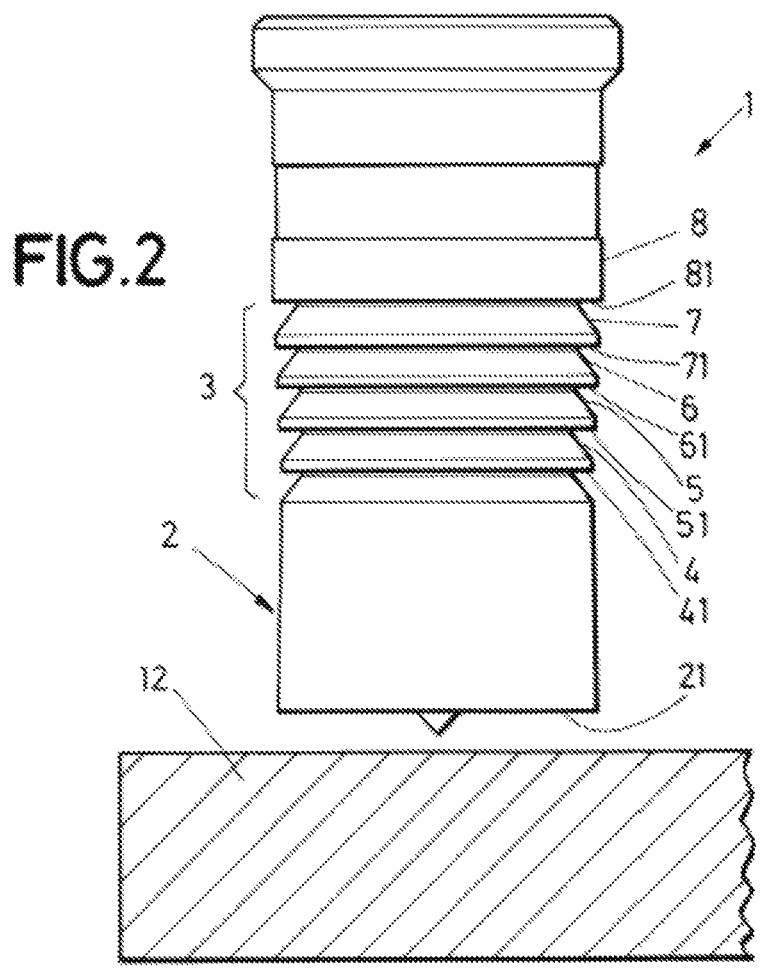
FIG. 2 shows a punching device according to the disclosure, in a side view.

FIG. 2 shows a punching device 1 according to the disclosure. This punching device 1 comprises
  a punching part 2 comprising a punching cutting edge 21 that limits a punching cutting area (not shown in this figure), the punching part 2 being intended to pierce a workpiece 12; and
  a broaching part 3 attached to the punching part 2 and intended to tear the workpiece 12 later than the punching part 2, the broaching part 3 comprising a first broaching tooth 4, a second broaching tooth 5, a third broaching tooth 6, a fourth broaching tooth 7 and a final broaching tooth 8.

The first broaching tooth 4 comprises a first broaching cutting edge 41, the second broaching tooth 5 comprises a second broaching cutting edge 51, the third broaching tooth 6 comprises a third broaching cutting edge 61 and the fourth broaching tooth 7 comprises a fourth broaching cutting edge 71. The broaching cutting edges 41, 51, 61 y 71 limit respectively broaching cutting areas (not shown in this figure).

The punching device also comprises a final broaching tooth which limits a final cutting area (not shown in this figure) which is greater than the fourth broaching cutting area (not shown in this figure), but the difference between the final broaching cutting area and the fourth broaching cutting area is lower than the difference between the broaching cutting areas of any pair of the remainder cutting edges 41, 51, 61, 71.

FIGS. 3*a* to 3*e* show a top view of the cutting areas of the different elements comprised in the punching part and the broaching part.

Figure 3A:
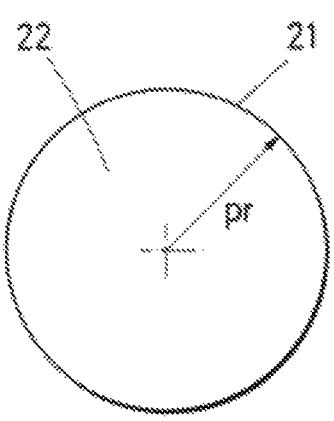
FIG. 3a shows a top view of the punching cutting edge according to the punching device of FIG. 2.

FIG. 3*a* shows a top view of the punching cutting edge 21 of a particular embodiment of punching device according to the disclosure, which delimits a punching cutting area 22. The punching cutting edge 21 is a circumference with a punching radius pr.

Figure 3B:
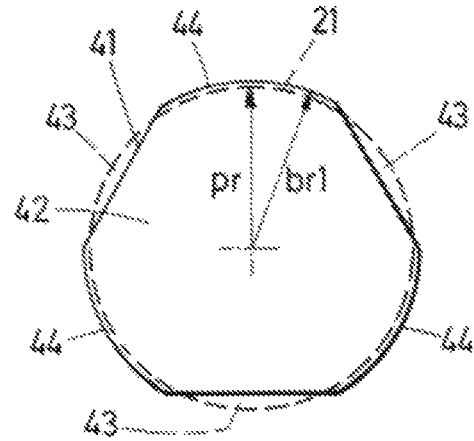
FIG. 3b shows a top view of the first broaching cutting edge according to the punching device of FIG. 2.

FIG. 3*b* shows a top view of the first broaching cutting edge 41 of the same punching device as in the previous figure, which delimits a first broaching cutting area 42. The punching cutting edge 21 is shown in dotted lines to show the relation between them. This first broaching cutting edge 41 comprises first broaching circle arcs 44 with a first broaching radius of curvature br1 and straight portions that makes the first broaching cutting area 42 a circle with chords, such that the first gaps 43 are circular segments. The first broaching radius of curvature br1 is greater than the punching radius of curvature pr, but the centre used to define the punching cutting edge 21 and the first broaching cutting arcs 44 is the same.

Figure 3C:
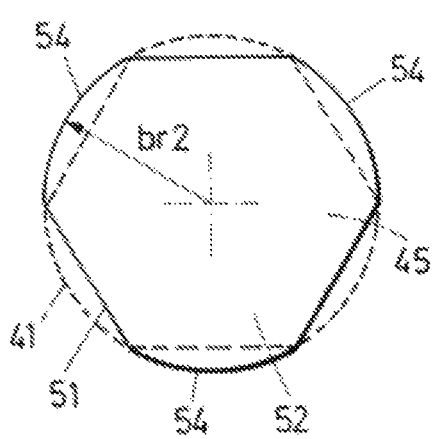
FIG. 3c shows a top view of the second broaching cutting edge according to the punching device of FIG. 2.

FIG. 3*c* shows a top view of the second broaching cutting edge 51 of the same punching device as in the previous figure, which delimits a second broaching cutting area 52. The first punching cutting edge 41 is shown in dotted lines to show the relation between them. This second broaching cutting edge 51 comprises second broaching circle arcs 54 with a second radius of curvature br2 which is the same as the first radius of curvature br1. The second broaching cutting area 52 covers all the gaps which were left by the first broaching cutting area 42, so that the first group cutting area 45, which is the cutting area covered by both first and second broaching cutting area is greater than the punching cutting area 22. In this particular case, this cutting area covered by both first and second broaching cutting area is a circle having a radius of curvature br1, which is greater than the radius pr of the punching cutting area 22.

In this embodiment, the second broaching cutting edge 51 also comprises straight portions that makes the second broaching cutting area 52 a circle with chords. The second circle arcs 54 cover the circular segments left by the first broaching cutting edge 41. But in this case, the chords of the second broaching cutting area 52 define circular segments which have already been cut by the first broaching cutting edge 41, so that the shape of the second broaching cutting edge 51 in this zone is irrelevant, as this material has been cut by the circle arcs 44 of the first broaching cutting edge 41.

Figure 3D:
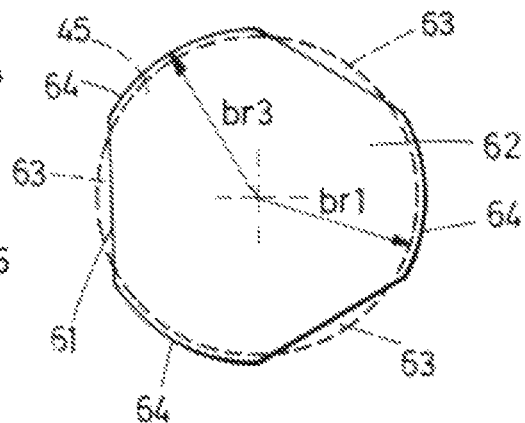
FIG. 3d shows a top view of the third broaching cutting edge according to the punching device of FIG. 2.

FIG. 3*d* shows a top view of the third broaching cutting edge 61 of the same punching device as in the previous figure, which delimits a third broaching cutting area 62. The first group cutting area 45 is shown in dotted lines to show the relation between them. This third broaching cutting edge 61 comprises third broaching circle arcs 64 with a third broaching radius of curvature br3 and straight portions that makes the third broaching cutting area 62 a circle with chords, such that the second gaps 63 are circular segments. The third broaching radius of curvature br3 is greater than the first broaching radius of curvature br1, but the centre used to define the first group cutting area 45 and the third broaching cutting arcs 64 is the same.

Figure 3E:
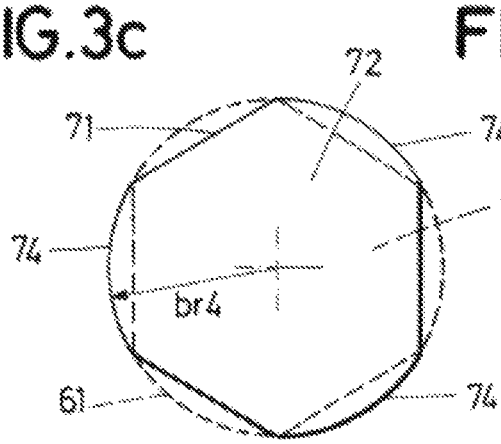
FIG. 3e shows a tope view of the fourth cutting edge according to the punching device of FIG. 2.

FIG. 3*e* shows a top view of the fourth broaching cutting edge 71 of the same punching device as in the previous figure, which delimits a fourth broaching cutting area 72. The first punching cutting edge 61 is shown in dotted lines to show the relation between them. This fourth broaching cutting edge 71 comprises fourth broaching circle arcs 74 with a fourth radius of curvature br4 which is the same as the third radius of curvature br3. The fourth broaching cutting area 72 covers all the gaps which were left by the third broaching cutting area (not shown in this figure), so that the second group cutting area 65, which is the cutting area covered by both third and fourth broaching cutting area is greater than the first group cutting area 45. In this particular case, this second group cutting area 65 is a circle having a radius of curvature br3 which is greater than the radius of curvature br1 of the first group cutting area 45.

In this embodiment, the fourth broaching cutting edge 71 also comprises straight portions that make the fourth broaching cutting area 72 a circle with chords. The fourth circle arcs 74 cover the circular segments left by the third broaching cutting edge 61. But in this case, the chords of the fourth broaching cutting area 72 define circular segments which have already been cut by the third broaching cutting edge 61, so that the shape of the fourth broaching cutting edge 71 in this zone is irrelevant, as this material has been cut by the circle arcs 64 of the third broaching cutting edge 61.

Figure 4A:
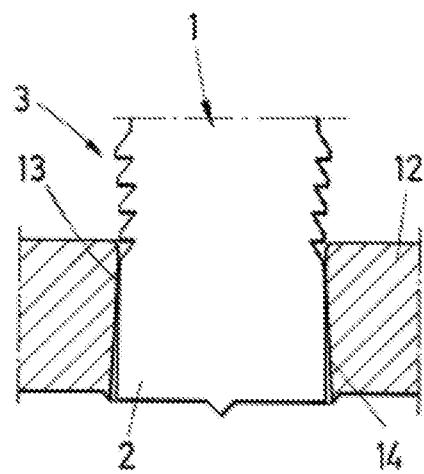
FIG. 4a shows a first embodiment of a method according to the disclosure wherein the punching device is entering a workpiece.
Figure 4B:
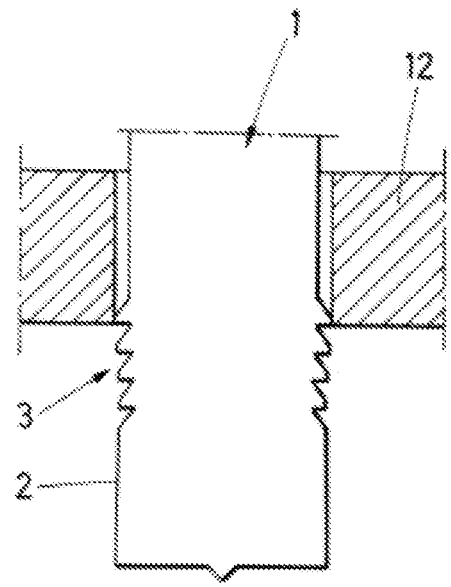

FIGS. 4*a* and 4*b* show a first embodiment of a method according to the disclosure, where the punching part 2 and the broaching part 3 are attached and are parts of a single punch.

FIG. 4*a* shows a punching device 1 according to the disclosure entering a workpiece 12. During the first third of the thickness, the cut is regular, and a burnished surface 13 is obtained when the punching portion 2 passes, the same as in the punching process which uses a conventional punch. The punching portion 2 exits the workpiece 12 after piercing it, leaving an irregular conical surface 14 after it.

FIG. 4*b* shows the final outcome of the punching operation. As the broaching portion 3 subsequently enters the workpiece 12, it gradually cuts the part of the hole which contains the cracks, providing a final result with a good dimensional tolerance and without cracks.

Figure 5A:
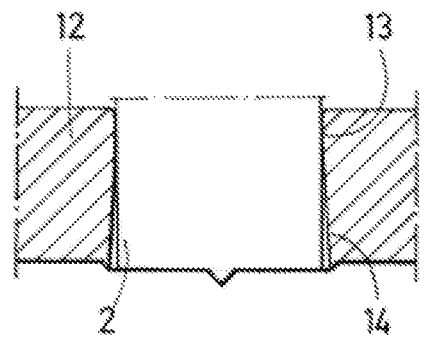
FIG. 5a shows a second embodiment of a method according to the disclosure wherein a punching part of a punching device enters a workpiece.
Figure 5B:
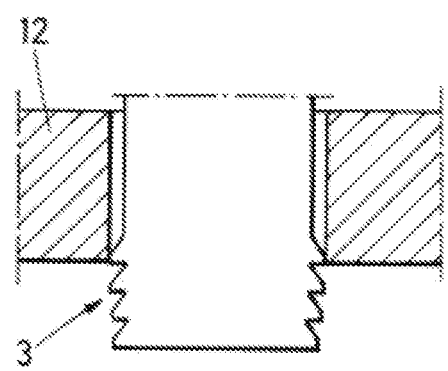

FIGS. 5*a* and 5*b* show a different embodiment of a method according to the disclosure. In this method, the punching part 2 and the broaching part 3 are not part of a single punch, but are used with the same punching machine.

FIG. 5*a* shows a punching part 2 of a punching device according to the disclosure entering a workpiece 12. During the first third of the thickness, the cut is regular, and a burnished surface 13 is obtained when the punching portion 2 passes, the same as in the punching process which uses a conventional punch. But as the punching portion 2 exits the workpiece 12 after piercing it, it leaves an irregular conical surface 14 after it FIG. 5*b* shows the final outcome of the punching operation. A broaching portion 3 is subsequently used to pierce the workpiece 12, and it gradually cuts the part of the hole which contains the cracks, providing a final result with a good dimensional tolerance and without cracks.

The disclosure is obviously not limited to the specific embodiments described herein, but also encompasses any variations that may be considered by any person skilled in the art (for example, as regards the choice of materials, dimensions, components, configuration, etc.), within the general scope of the disclosure as defined in the claims.

The invention claimed is:

1. A punching device, for punching a workpiece, the punching device comprising:
   a punching part including a punching cutting edge that limits a punching cutting area, the punching part being intended to pierce the workpiece; and
   a broaching part intended to tear the workpiece later than the punching part, the broaching part comprising a first broaching tooth and a second broaching tooth, the first broaching tooth comprising a first broaching cutting edge limiting a first broaching cutting area, and the second broaching tooth comprising a second broaching cutting edge limiting a second broaching cutting area, the first broaching cutting area covering the punching cutting area except for at least one first gap, the second broaching cutting area covering the at least one first gap;
   wherein the first broaching cutting area and the second broaching cutting area define a total broaching cutting area which is greater than the punching cutting area, and wherein the punching cutting edge is circular and comprises a punching radius, the first broaching cutting edge comprises first broaching circle arcs with a first broaching radius of curvature and the second broaching cutting edge comprises second broaching circle arcs with a second broaching radius of curvature which is the same as the first broaching radius of curvature and greater than the punching radius, and wherein the first broaching circle arcs and the second broaching circle arcs have the same center.

2. The punching device according to claim 1, wherein the broaching part further comprises a third broaching tooth and a fourth broaching tooth, and wherein the third broaching tooth comprises a third broaching cutting edge limiting a third broaching cutting area and the fourth broaching tooth comprises a fourth broaching cutting edge limiting a fourth broaching cutting area, the third broaching cutting area being greater than the first broaching cutting area and covering the second broaching cutting area except for at least one second gap, the fourth broaching cutting area covering the at least one second gap.

3. The punching device according to claim 1, further comprising a final broaching tooth, with a final cutting edge that limits a final cutting area greater than any other cutting area.

4. The punching device according to claim 2, wherein the third broaching cutting edge comprises third broaching circle arcs with a third broaching radius of curvature, and the fourth broaching cutting edge comprises fourth broaching circle arcs with a fourth radius of curvature which is the same as the third broaching radius of curvature and greater than the first broaching radius of curvature, and wherein the third broaching circle arcs and the fourth broaching circle arcs have the same center.

5. The punching device according to claim 1, wherein the first broaching cutting edge further comprises at least one straight portion such that the first broaching cutting area is a circle with at least one chord in such a way that the first gap is a circular segment.

6. The punching device according to claim 4, wherein the third broaching cutting edge further comprises at least one straight portion such that the third broaching cutting area is a circle with at least one chord in such a way that the second gap is a circular segment.

7. The punching device according to claim 1, wherein the second broaching cutting area is between 1.025 and 2.8 times the punching cutting area.

8. The punching device according to claim 1, wherein the second broaching cutting area is up to 1.25 times the punching cutting area.

9. The punching device according to claim 1, wherein the punching part and the broaching part are attached and are portions of a single punch.

10. A punch comprising
    a punching part comprising a punching cutting edge that limits a punching cutting area, the punching part being intended to pierce the workpiece; and
    a broaching part attached to the punching part and intended to tear the workpiece later than the punching part, the broaching part comprising a first broaching tooth and a second broaching tooth, the first broaching tooth comprising a first broaching cutting edge limiting a first broaching cutting area, and the second broaching tooth comprising a second broaching cutting edge limiting a second broaching cutting area, the first broaching cutting area covering the punching cutting area except for at least one first gap, the second broaching cutting area covering the at least one first gap;
    wherein the first broaching cutting area and the second broaching cutting area define a total broaching cutting area which is greater than the punching cutting area, and wherein the punching cutting edge is circular and comprises a punching radius, the first broaching cutting edge comprises first broaching circle arcs with a first broaching radius of curvature and the second broaching cutting edge comprises second broaching circle arcs with a second broaching radius of curvature which is the same as the first broaching radius of curvature and greater than the punching radius, and wherein the first broaching circle arcs and the second broaching circle arcs have the same center.

11. A punching method including the following steps:
    providing the punching device according to claim 1;
    punching a workpiece with the punching device; and
    broaching the workpiece with the punching device.

12. The punching method according to claim 11, wherein the punching part and the broaching part pierce the workpiece in a same hit of the punching device.

13. The punching method according to claim 11, wherein the punching part and the broaching part pierce the workpiece in two different hits of the punching device.

* * * * *